United States Patent Office 2,699,431
Patented Jan. 11, 1955

2,699,431
COMPOSITIONS CONTAINING A RUBBER AND AN ACETONE FORMALDEHYDE RESIN

Mortimer T. Harvey, South Orange, and Peter L. Rosamilia, Newark, N. J., assignors to Harvel Research Corporation, a corporation of New Jersey No Drawing. Application June 19, 1951,
Serial No. 232,470

7 Claims. (Cl. 260—3)

This invention relates to novel compositions of matter and to methods for making them and also to novel articles of manufacture either in their intermediate or final state in which said novel compositions are components. In one of its more specific aspects the invention is directed to novel resinous compositions for improving various characteristics of rubbery substances. More particularly one of the specific aspects of this invention is directed to novel compositions of matter produced by combining a rubbery composition together with a combination of resorcinol and water-soluble organic reaction products of acetone and formaldehyde. The rubbery materials may be natural rubber, rubbery polymers of chloroprene known commercially as "neoprene," rubbery copolymers of butadiene and styrene known commercially as "Buna-S" and also "GR-S" and rubbery copolymers of butadiene and acrylonitrile known commercially as "Buna-N." The aforesaid various copolymers of butadiene and styrene as well as butadiene and acrylonitrile are also known commercially on the market as "Hycar." All of these various rubbery materials are water dispersible and are available in the open market in the form of water dispersions or emulsions known as latices.

I have discovered that these various rubbery materials either alone or in any combination of two or more with each other may have its tack, modulus, elongation and its adhesion characteristics to all types of fabric considerably improved by modifying them before curing with the aforesaid combination of resorcinol and acetone-formaldehyde organic reaction product. The ratio by weight of the acetone-formaldehyde to the resorcinol in said combination is in the range of 100 parts of the former to 5–15 and preferably 7–10 parts of the latter. While it is preferable to employ straight resorcinol in said combination, I may employ in place thereof various commercially available mixtures of phenol and resorcinol in which the amount of phenol by weight is up to 50% of the weight of the mixture. The acetone-formaldehyde organic reaction product in said combination is water soluble and is resinous in its intermediate state and is capable of being heat converted on the alkaline side at 300° F. to the substantially solid and infusible state. Said water soluble acetone-formaldehyde resinous organic reaction product employed in said combination may be produced in any desired manner by reacting acetone and formaldehyde in any desired molecular proportion, but for most purposes because of economy and other factors I prefer to employ those produced in the manner hereinafter set forth. The ratio by weight of said rubbery material to said combination of acetone-formaldehyde organic reaction product and resorcinol may be in the range of 100 parts of the rubbery material to 10–40 parts of the combination and preferably 100 parts of the rubbery material to 15–25 parts of the combination.

In carrying out this invention, to the water emulsion or dispersion of the desired rubbery material or combination of rubbery materials, is added said acetone-formaldehyde organic reaction product and resorcinol in the desired proportion. The combination of acetone-formaldehyde and resorcinol is a homogeneous composition which is first produced by mixing the desired amount of resorcinol with the acetone-formaldehyde reaction product in an aqueous solution. However made up, in whatever proportions of said components desired, this combination of acetone-formaldehyde and resorcinol has an amount of alkaline agent such as NaOH, KOH, etc. added thereto and this is added to the desired latex. This mixture is stirred or otherwise agitated or treated until a homogeneous mass is produced and which now consists of an aqueous dispersion of one or more of said rubbery materials having said combination of acetone-formaldehyde reaction product and resorcinol as solute in the continuous aqueous phase. This novel product may have added thereto quantities of various compounding chemicals, such as rubber stabilizers, anti-oxidants, accelerators, fillers, vulcanizates, etc. commonly employed in latices. The resultant novel product may be coated on a base in films of various thicknesses, dried and then cured and it will be found that the modulus, elongation and also the adhesion of the cured product to the particular base such as cotton, nylon, rayon, etc. are much greater than the corresponding characteristics of a similarly cured product which has not had the combination of resorcinol and acetone-formaldehyde reaction product added thereto.

It is also with the purview of this invention to employ an amine in the combination. When employed, such an amine, which is water soluble and capable of reacting with formaldehyde is added to an aqueous solution of the water soluble acetone-formaldehyde resinous reaction product in an amount of 1–25% by weight of the acetone formaldehyde resin. Thus to 100 parts of the acetone-formaldehyde resinous reaction product is added 1–25 parts of one of said amines, such as ethanol amine, diethanol amine, triethanolamine, hydroxy ammonium chloride, p-aminophenol, etc. The amine additive serves to stabilize the free or loosely bound formaldehyde in the solution and also to impart a greater water tolerance to the combination after the addition of resorcinol. If desired, after the amine addition, the resultant aqueous solution may be neutralized with a weak organic acid, such as lactic, hydroxy acetic, etc. Then to said mass is added 5–15 parts of resorcinol. This combination may be combined with the rubbery material in the proportions and manner heretofore stated also to provide novel products.

The acetone-formaldehyde resinous organic products which are water-soluble may be produced under various conditions or procedures. Such resins which are water soluble and stable resins may be produced in comparatively high yields, at relatively low cost and in foolproof and danger-proof factory production by reacting acetone and formaldehyde under controlled conditions. Such water soluble resins are soluble in at least twice their volume of water, may be converted to the infusible state in the presence of an alkaline reagent to provide infusible resins, which are dense, hard, firm and insoluble in water, acetone, petroleum spirits, aromatic spirits, etc. and are unaffected by alkalies and dilute acids. In factory production, acetone and formaldehyde are placed in a reacting vessel to provide a charge thereof in the desired proportion and preferably of one mole of acetone to three to five moles of formaldehyde. The formaldehyde is preferably in aqueous solution of any desired concentration generally determined by its concentration in the available solutions of commerce.

The reaction of the acetone and formaldehyde is carried out with the aid of an alkaline catalyst and those which are preferred are the strongly alkaline agents, such as sodium hydroxide, potassium hydroxide, calcium hydroxide, potassium carbonate, sodium carbonate, etc. These strongly alkaline agents are of such a nature as to be capable of providing an exothermic reaction between the acetone and formaldehyde after the reaction has been initiated by the aid of external heat. The reaction is carried out at temperatures ranging up to about 210° F. and maintained in the range of 160–210° F. and preferably in the range of 175–205° F. until the quantity by weight of the water soluble resin produced measures at least 75% of the combined weights of the acetone and formaldehyde in the original charge. The quantity of alkaline agent employed is within the range of that necessary to produce said minimum percentage of water soluble thermo-setting resin content but less than that required to produce a solid infusible resin content measuring more than 5% of the combined weights of the acetone and formaldehyde in the original charge.

When the mole ratio of the acetone to the formaldehyde in the charge is one to three, the quantity by weight of sodium hydroxide employed is less than 4%, generally 1%–3% and preferably approximately 2% of the combined weights of acetone and formaldehyde in the charge; when the mole ratio of the acetone to the formaldehyde in the charge is one to four, the quantity by weight of sodium hydroxide employed is less than 5%, generally 1.5–4% and preferabaly approximately 2.5% of the combined weights of acetone and formaldehyde in said charge; when the mole ratio of acetone to the formaldehyde in the charge is one to five, the quantity by weight of sodium hydroxide employed is less than 7.75%, generally 2%–6% and preferably approximately 4% of the combined weights of acetone and formaldehyde in said charge. Of course instead of employing sodium hydroxide, the alkaline equivalent of any other strongly alkaline reagent may be used.

The sodium hydroxide or other alkaline reagent is preferably first dissolved in a solvent such as water and the alkaline reagent is added to the charge as a solution. For best results, the solution of alkaline reagents should not be added all at one time in factory practice. It may be added in increments, the amounts of which are dictated or controlled by the speed of reaction desired, but in no case should the increment measure more than one-third of total of the alkaline reagent used. After the charge of acetone and formaldehyde is contained in the reaction vessel, the aqueous solution generally 50% concentration of the sodium hydroxide or other alkaline reagent is made up in a separate container, with the amount of reagent dependent upon the mole ratio of acetone to formaldehyde in the charge. The aqueous alkaline solution is divided into three or four equal parts. One part is then added to the acetone and formaldehyde charge which is constantly stirred throughout the entire process. After this addition, the mass is externally heated to a temperature of 120–130° F. The heat is shut off and the mass exothermically reacts and its temperature rises and by the use of cooling water in the jacket of the reaction vessel, its temperature is allowed to rise to approximately 200° F. Then its temperature goes down to approximately 175° F. whereupon the second quarter of the alkaline solution is added. Again the temperature rises and is allowed to rise to 200° F. and falls to 175° F. The third quarter of the alkaline solution is added and again the temperature rises and is allowed to rise to 200° F. and falls to 175° F. The last quarter of the alkaline solution is added and again the temperature rises and is allowed to rise to 200° F. and then falls to 140° F. whereupon the cooling water is shut off. Then the mass may be maintained in the state of boiling under a reflux condenser for ½ to 1 hour if desired and then allowed to cool to 140° F. Either with or without the boiling under reflux, vacuum is now gradually applied in the reaction vessel to remove some of the water of and to cause cooling of the mass until the temperature of the mass is lowered to 105° F.–110° F. At this point a 28–29″ vacuum is applied and dehydration is continued until a solution of the desired percentage of solids is obtained or until the resin is substantially anhydrous. In either case the resin produced is liquid, water soluble and thermosetting and measures at least 75% of the combined weights of the acetone and formaldehyde in the original charge.

The following are examples of methods for producing high yields of water-soluble resins from acetone and formaldehyde and are given merely by way of illustration and not in a limiting sense.

*Example 1 (1 mole acetone—4 moles of formaldehyde)*

300 lbs. acetone
1700 lbs. formaldehyde (37% concentration)
25 lbs. NaOH in
60 lbs. water The caustic soda-water solution was divided into four equal portions. The unit was loaded with the acetone and formaldehyde with the steam on and stirring equipment in operation and the material was heated to 120–125° F. The first portion of caustic soda-water solution was added and the steam cut off. As the temperature rises to 130° F. and the cold water is turned on, an exothermic reaction takes place and temperature slowly rises to 200° F. then slowly begins to fall. At 185° F. the second portion of caustic soda-water solution is added whereupon the temperature again rises to 200° F. Upon cooling to 185° F. the procedure is repeated allowing the temperature to rise and fall between the additions of caustic soda-water solution and keeping the cold water on the jacket at all times. The mass is then allowed to cool to 145° F. at which time the cold water is shut off. Vacuum is turned on keeping the vent open. The vent is slowly closed and the steam turned on. Dehydration may be continued to produce a resin of 75%–100% solids. The amount of resin produced measured more than 75% of the combined weights of the acetone and formaldehyde in the original charge. The resin known as Product A was amber colored, is stable for at least 6 months at 30° C., cures in two hours at 140° C., cures within four hours upon adding 5% lime thereto and cures within 2½ hours upon adding 10% lime thereto. Upon addition of 2%, 5% and 10% lime thereto it will cure in 60, 10 and 3–5 minutes respectively at temperatures of 140° F.

*Example 2 (1 mole of acetone—3 moles of formaldehyde)*

30 parts of acetone
126 parts of formaldehyde (37% concentration)
2 parts of NaOH in
4 parts of water The caustic soda-solution was divided into three equal portions. Using the same procedure as that set forth in Example 1, the resultant resinous product produced was amber colored and measured more than 75% of the combined weights of acetone and formaldehyde in the original charge. The resin known as Product B was soluble in water in up to 200% dilution and insoluble in 600% dilutions in water. 50 parts of this resin mixed with 5 parts of lime was converted to the solid state at room temperature after about ½ hour which on standing becomes hard, firm, infusible and insoluble in acetone, petroleum spirits, aromatic spirits and chlorinated solvents, also unaffected by alkalies and dilute acids.

*Example 3 (1 mole of acetone—5 moles of formaldehyde)*

30 parts of acetone
212 parts of formaldehyde (37% concentration)
2 parts of NaOH in
8 parts of water Employing the same procedure as that set forth in Example 1, except that after the last addition of caustic soda-water solution and subsequent drop in temperature following the last exothermic reaction, the entire mass is heated to boiling under a reflux condenser for approximately 15 minutes. The quantity of free formaldehyde in the mass is determined and found to be 5.2% of the amount of formaldehyde in the original charge. Upon dehydration at 210° F. in the manner heretofore indicated, the resultant substantially anhydrous resin known as product C was an amber colored viscous mass infinitely soluble in water and measuring more than 75% of the combined weight of acetone and formaldehyde in the original charge.

These various water soluble thermosetting resins, specific illustrations of which are shown in Examples 1–3, may be heat converted to the infusible state under acid, neutral or alkaline conditions. Such resins of the thermosetting and water soluble type may also be produced by reacting acetone and formaldehyde in the mole ratio of 1 of acetone to 3–5 of formaldehyde and employing weakly alkaline materials in fairly large amounts and refluxing the mass for long periods of time or by carrying out the reaction at comparatively low temperatures with strong alkalies. However, such procedures are not recommended for commercial production because of the cost of production in either case and because when a large amount of weakly alkaline catalyst is used, the presence of the side reaction products thereof in the resin is objectionable.

The following procedure taken in conjunction with the tables as set forth illustrate the results which may be obtained with this invention. In the hereinafter set forth tests there was employed a combination hereinafter known as product AK consisting by weight of 100 parts of a water-soluble resinous acetone-formaldehyde organic reaction product such as product B of Example 2, and 10 parts of resorcinol. Product AK is dissolved in about equal weight of water. This water solution of product AK has a stability factor of at least one year. To 200 parts by weight of said aqueous solution of product AK was added and mixed, approximately 100 parts by weight of a 5% aqueous solution of NaOH or KOH to provide the desired alkalinity for appropriate curing of the resin in the finished product. A sample of the thus alkali treated product AK after dehydration and cured at 300° F. for 15 minutes was hard and water insoluble. Alkali treated product AK was incorporated in various types of rubbery latices and coated on untreated cotton, nylon and rayon panels, dried and cured and comparative tests were run under the following procedure:

Adhesive compounds of GRS, Hycar and neoprene latices with and without alkali treated product AK were prepared and then coated in duplicate on cotton, nylon and rayon panels. The panels were 6" wide and 24" long. A coating of 0.25–0.5 mil was first applied to all panels by means of stainless steel coating bars and air dried for 24 hours and an additional coating of 0.25–0.5 mil thickness was next applied to each of the panels. The total thickness of the coatings was 0.5 to 1.0 mil. After the second coat was air dried for 24 hours, two identical panels were placed together and cured under pressure for 15 minutes at 300° F. Strips 1" wide were cut from the duplexed and cured panels and the adhesion measured by the pull in grams necessary to just separate the top piece of cloth. A spring tension scale was used to measure the pull.

The following compounding paste formulae were made up. To insure a homogeneous dispersion each of the pastes was ball milled for at least 48 hours.

These various adhesive formulations showed no signs of throwing out the AK resin after remaining for 1 month in a sealed jar at room temperature (70°–90° F.). The ageing on natural rubber latex was 1 week.

The comparative test results of these various compositions were as follows:

|  | GRS, g./in. width | | Neoprene, g./in. width | | Hycar, g./in. width | | Natural Rubber, g./in. width | |
| --- | --- | --- | --- | --- | --- | --- | --- | --- |
|  | Control | +AK | Control | +AK | Control | +AK | Control | +AK |
| Rayon | 600 | 1,800 | 1,200 | 1,400 | 1,200 | 1,300 | 100 | 1,400 |
| Nylon | 900 | 1,400 | 600 | 1,800 | 600 | 1,400 | 200 | 1,500 |
| Cotton | 1,800 | 2,500 | 2,000 | 2,900 | 1,200 | 2,500 | 2,500 | 2,500 |

Some of the significant conclusions are as follows:
1. Improves adhesion of synthetic rubbers on cotton, rayon and nylon and improves adhesion of natural rubbers on rayon and nylon.
2. The uncured panels coated with the natural and synthetic latices. Product AK compounds are tackier than those coated with the latices containing no resin.
3. Emulsions of the specified mixtures have 1 month stability for the synthetic rubber resins, and one week for the natural rubber resins.

By following the teachings of this invention novel latices of said rubbery materials containing water-soluble acetone formaldehyde resins and resorcinol are produced. These novel products when dried and cured as before set forth in the examples provide novel articles of commerce consisting of a base carrying one or more of said rubbery materials and said combination of resin and resorcinol homogeneous dispersed throughout the mass and in the cured state. Thus, the characteristics before set forth are imparted to the combination of base carrying said product.

We claim:

1. A novel composition comprising a rubbery material selected from the group consisting of natural rubber, polymerized chloroprene, copolymers of butadiene and styrene and copolymers of butadiene and acrylonitrile, water soluble acetone-formaldehyde organic reaction product and resorcinol.

2. A base carrying a cured combination of a rubbery material selected from the group consisting of natural rubber, polymerized chloroprene, copolymers of butadiene and styrene and copolymer of butadiene and acrylonitrile, water soluble acetone-formaldehyde organic reaction product and resorcinol, said combination before curing having been on said base and cured thereon.

3. A novel composition of matter comprising an aqueous dispersion of a rubbery material selected from the group consisting of natural rubber, polymerized chloroprene, copolymers of butadiene and styrene and copolymers of butadiene and acrylonitrile, water soluble acetone-formaldehyde organic reaction product and resorcinol, the ratio by weight of said rubbery material to the combined weights of said reaction product and resorcinol being in the range of 100–10 to 100–40 and the ratio by weight of said reaction product to said resorcinol being in the range of 100–5 to 100–15.

|  | GRS Paste, Dry | Neoprene Paste, Dry | Hycar Paste, Dry | Natural Latex Paste, Dry |
| --- | --- | --- | --- | --- |
| Zinc Oxide | 3.0 | 25.0 | 2.0 | 1.0 |
| Darvan | 0.3 | 3.0 | 0.3 | 0.3 |
| Age Rite White | 1.0 | | | |
| Age Rite Alba | | | | 1.0 |
| NaOH | 0.1 | | 0.1 | |
| Sulphur | 2.0 | | 1.5 | 1.0 |
| Zinc Dimethyl Dithiocarbamate | 2.0 | | 1.5 | |
| Whiting | | 10.0 | | |
| S. R. F. Black | | 10.0 | | |
| Neozene D | | 5.0 | | |
| Dixie Clay | | | 10.0 | |
| Gum Arabic | | | | 0.1 |
| Zinc Dibutyl Dithiocarbamate | | | | 1.0 |
| Water | | | | 0.0 |
|  | 8.4 | 53.0 | 15.4 | 4.4 |
| Percent Total Solids | 49.7 | 51.4 | 38.1 | 40.3 |

Darvan—Sodium salt of a polymerized alkylaryl sulphonic acid.
Age Rite White—Symmetrical di-beta-naphthyl-p-phenylenediamine.
Age Rite Alba—Hydroquinone nonobenzylether.
Neozene D—Phenyl-beta-naphthylamine.
S. R. F. Black—Carbon black.

Then the following adhesive formulae were made up and the ingredients are set forth on a dry weight basis:

|  | GRS Control | +AK | Neoprene Control | +AK | Hycar Control | +AK | Natural Rubber Control | +AK |
| --- | --- | --- | --- | --- | --- | --- | --- | --- |
| GRS (type IV) (41%) | 100 | 100 | | | | | | |
| Neoprene 571 (50%) | | | 100 | 100 | | | | |
| Hycar 1552 (50%) | | | | | 100 | 100 | | |
| Natural Latex (62%) | | | | | | | 100 | 100 |
| Aquarex D (10%) | 1.0 | 1.0 | 1.0 | 1.0 | 1.0 | 1.0 | 1.0 | 1.0 |
| Water Glass (10%) | | | 0.25 | 0.25 | | | | |
| GRS Paste | 8.4 | 8.4 | | | | | | |
| Neoprene Paste | | | 53.0 | 53.0 | | | | |
| Hycar Paste | | | | | 15.4 | 15.4 | | |
| Nat. Rubber Paste | | | | | | | 4.4 | 4.4 |
| Casein (15%) | 2.0 | 2.0 | 2.0 | 2.0 | 2.0 | 2.0 | 9.0 | 9.0 |
| KOH (10%) | 0.8 | 0.8 | | | 0.8 | 0.8 | | |
| NaOH (10%) | | | 1.0 | 1.0 | | | 1.0 | 1.0 |
| Product AK (40%) | | 20.0 | | 20.0 | | 20.0 | | 20.0 |
|  | 112.2 | 132.2 | 157.25 | 177.25 | 119.2 | 139.2 | 115.4 | 135.4 |
| Percent Total Solids | 32.7 | 33.7 | 32.0 | 33.0 | 30.0 | 31.0 | 30.6 | 30.3 |

Aquarex D—Sodium salts sulfate mono esters of higher fatty alcohols.

4. A novel composition of matter comprising an aqueous dispersion of rubber and water-soluble acetone-formaldehyde organic reaction product and resorcinol the ratio by weight of said rubber to the combined weights of said reaction product and resorcinol being in the range of 100–10 to 100–40 and the ratio by weight of said reaction product to said resorcinol being in the range of 100–5 to 100–15.

5. A novel composition of matter comprising an aqueous dispersion of rubbery polymerized chloroprene and water-soluble acetone-formaldehyde organic reaction product and resorcinol the ratio by weight of said rubbery polymerized chloroprene to the combined weights of said reaction product and resorcinol being in the range of 100–10 to 100–40 and the ratio by weight of said reaction product to said resorcinol being in the range of 100–5 to 100–15.

6. A novel composition of matter comprising an aqueous dispersion of copolymer of butadiene and styrene and water-soluble acetone-formaldehyde organic reaction product and resorcinol the ratio by weight of said copolymer of butadiene and styrene to the combined weights of said reaction product and resorcinol being in the range of 100–10 to 100–40 and the ratio by weight of said reaction product to said resorcinol being in the range of 100–5 to 100–15.

7. A novel composition of matter comprising an aqueous dispersion of copolymer of butadiene and acrylonitrile and water-soluble acetone-formaldehyde organic reaction product and resorcinol the ratio by weight of said copolymer of butadiene and acrylonitrile to the combined weights of said reaction product and resorcinol being in the range of 100–10 to 100–40 and the ratio by weight of said reaction product to said resorcinol being in the range of 100–5 to 100–15.

References Cited in the file of this patent

UNITED STATES PATENTS

| | | |
|---|---|---|
| 2,398,331 | Rust et al. | Apr. 9, 1946 |
| 2,481,879 | Ross | Sept. 13, 1949 |

FOREIGN PATENTS

| | | |
|---|---|---|
| 613,931 | Great Britain | Dec. 7, 1948 |